(12) United States Patent  
Self et al.

(10) Patent No.: US 7,373,912 B2
(45) Date of Patent: May 20, 2008

(54) OIL LEVEL INDICATING SYSTEM FOR INTERNAL COMBUSTION ENGINE

(75) Inventors: Daryl Self, Trenton, MI (US); Jamie Mink, Brownstown, MI (US); Paul Reinhart, Livonia, MI (US); Dave Frayne, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/422,676

(22) Filed: Jun. 7, 2006

(65) Prior Publication Data

US 2007/0283921 A1    Dec. 13, 2007

(51) Int. Cl.
*F16C 3/14* (2006.01)
(52) U.S. Cl. .................. 123/196 R; 184/1.5
(58) Field of Classification Search .................. 33/722, 33/726, 730, 731; 123/196 R; 73/426, 428
See application file for complete search history.

(56) References Cited

U.S. PATENT DOCUMENTS

| | | | | |
|---|---|---|---|---|
| 3,460,181 A | * | 8/1969 | Denver ...................... | 15/220.4 |
| 3,735,494 A | * | 5/1973 | Gumtow ....................... | 33/726 |
| 4,174,574 A | * | 11/1979 | Kirchweger et al. .......... | 33/731 |
| 4,183,142 A | * | 1/1980 | Russell ........................ | 33/725 |
| 4,213,441 A | * | 7/1980 | Hamparian ............. | 123/196 R |
| 4,331,185 A | * | 5/1982 | Rinaldo et al. ............... | 141/95 |
| 5,074,380 A | * | 12/1991 | Bedi et al. .................... | 184/1.5 |
| 5,992,037 A | * | 11/1999 | Klotz ........................... | 33/722 |
| 6,227,921 B1 | * | 5/2001 | Feehan ..................... | 440/88 R |
| 6,981,574 B1 | * | 1/2006 | Bedi .......................... | 184/1.5 |
| 7,017,546 B1 | * | 3/2006 | Patel et al. ............. | 123/196 R |

* cited by examiner

*Primary Examiner*—Stephen K. Cronin
*Assistant Examiner*—Jason Benton
(74) *Attorney, Agent, or Firm*—Gary Smith; Dickinson Wright PLLC

(57) ABSTRACT

An oil level indicating system for an internal combustion engine includes an indicator passageway extending through a cylinder block, cylinder head and up through a ported boss extending through an upper engine cover. The ported boss is sealingly engaged with the cylinder head of the engine so as to prevent fugitive oil from entering indicator passageway, thereby preventing erroneous oil level readings.

10 Claims, 6 Drawing Sheets

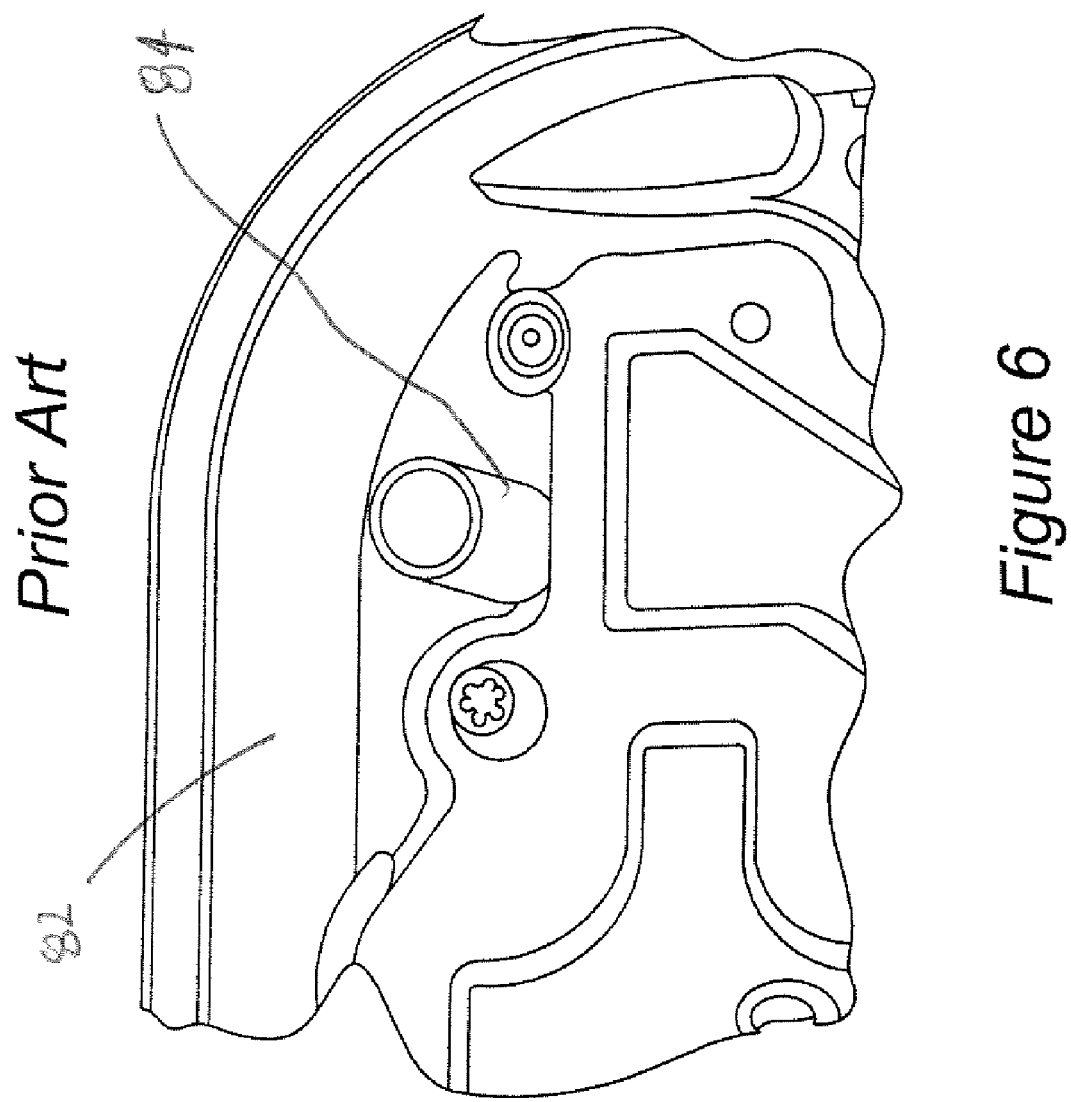

OIL LEVEL INDICATING SYSTEM FOR INTERNAL COMBUSTION ENGINE

BACKGROUND OF THE INVENTION

1. Field of the Invention

The present invention relates to a oil level indicating system for an internal combustion engine in which the indicator extends through a passage running from the top of the engine into the engine's oil pan, without any external, add-on tubing being required.

2. Disclosure Information

Oil level indicating systems for internal combustion engines have generally included an indicator embodied as a wire or thin, flexible blade which is allowed to pass into liquid within the engine's crankcase sump, so as to provide a direct reading for the level of oil within the engine. Such indicators have commonly used externally mounted tubes which sometimes extend through a sidewall of a cylinder block. Unfortunately, such tubes may become damaged during operation of the vehicle, or during storage and installation of an engine. Further, such tubes take space which is almost always at a premium in modern automotive vehicle engine compartments. Although certain engines have indicators mounted in a boring formed at a lower portion of the cylinder block, such as at an oil pan rail, this is not a satisfactory solution either, because it is difficult to reinsert the indicator once it has been removed. And, contamination is a problem because of the buildup of road grime on the lower part of the block, which may be dislodged by the vehicle operator when the indicator is being reinserted with the result that the contamination will be pushed into the crankcase by the incoming oil indicator.

FIGS. 5 and 6 show a prior art attempt to mount an oil indicator through a camshaft cover of an engine. The embodiment of FIGS. 5 and 6 suffers from two problems. First, tube 84, which is pressed into cover 82, may cause an external oil leak if the joint between the tube and the boss into which it is pressed is not accurately and robustly made up. Furthermore, tube 84 becomes loose during use of the engine, and could fall down into the engine causing a major engine failure. Furthermore, because tube 84 extends only into the space of the cylinder head valve springs, and, perhaps, a camshaft, oil is free to splash on the indicator when it is installed, which may give a false reading in the event that an uninitiated motorist fails to adequately clean the indicator before attempting to ascertain the level of oil within the engine.

The present oil level indicating system overcomes the problems shown with the prior art systems by providing presentation of the indicator at the topmost part of an engine with a passageway system that prevents inaccurate oil readings, while also avoiding issues with potential impairment of the engine's operation.

SUMMARY OF THE INVENTION

An oil level indicating system for an internal combustion engine includes an indicator passageway with several parts. A cylinder block passage extends generally vertically through a cylinder block from an oil plan rail to a cylinder head mating surface. A cylinder head passage extends generally vertically through a cylinder head from a cylinder block mating surface to a space enclosed by an upper cover. The cylinder head passage is in registry with the cylinder block passage. A ported boss extends through an upper engine cover. The ported boss has a lower end and registry width, in sealing the engaged width, and upper portion of the cylinder head passage. An oil level indicator is adapted to be extended through the indicator passageway from an upper portion of the ported boss to a location below the oil pan rail. The upper cover preferably comprises either a camshaft cover or rocker arm cover. Such covers are commonly called "valve covers" in automotive parlance. According to another aspect of the present invention, at least a portion of the cylinder block passage is formed as an outer surface of the cylinder block, in the form of a cylinder block vent stack which extends from the oil pan rail to the cylinder head mating surface. The indicator passageway may also include a channel formed in an oil pan attached to oil pan rail of the cylinder block.

It is an advantage of an oil level indicating system for an internal combustion engine that because the oil level indicator mount includes a boss extending upwardly from the camshaft cover, and with the boss formed integrally with the cover, the oil level indicator will be mounted robustly to the engine and may be mounted so as to avoid external engine oil leaks.

It is a further advantage of the present invention that the boss to which the oil level indicator is mounted is sealed to the cylinder head so as to prevent fugitive oil from entering the indicator passageway in the space enclosed by the camshaft cover.

It is yet a further advantage of an oil level indicating system according to the present invention that it is not possible for the system to fail and to result in any portion of the indicator passageway material ending up in the oil pan.

Other advantages and features of the present invention will become apparent when viewed in light of the detailed description of the preferred embodiment when taken in conjunction with the attached drawings and appended claims.

BRIEF DESCRIPTION OF THE DRAWINGS

FIGS. 5 and 6 are view of a portion of a prior art oil level indicating system.

DETAILED DESCRIPTION OF THE PREFERRED EMBODIMENT

Figure 1:
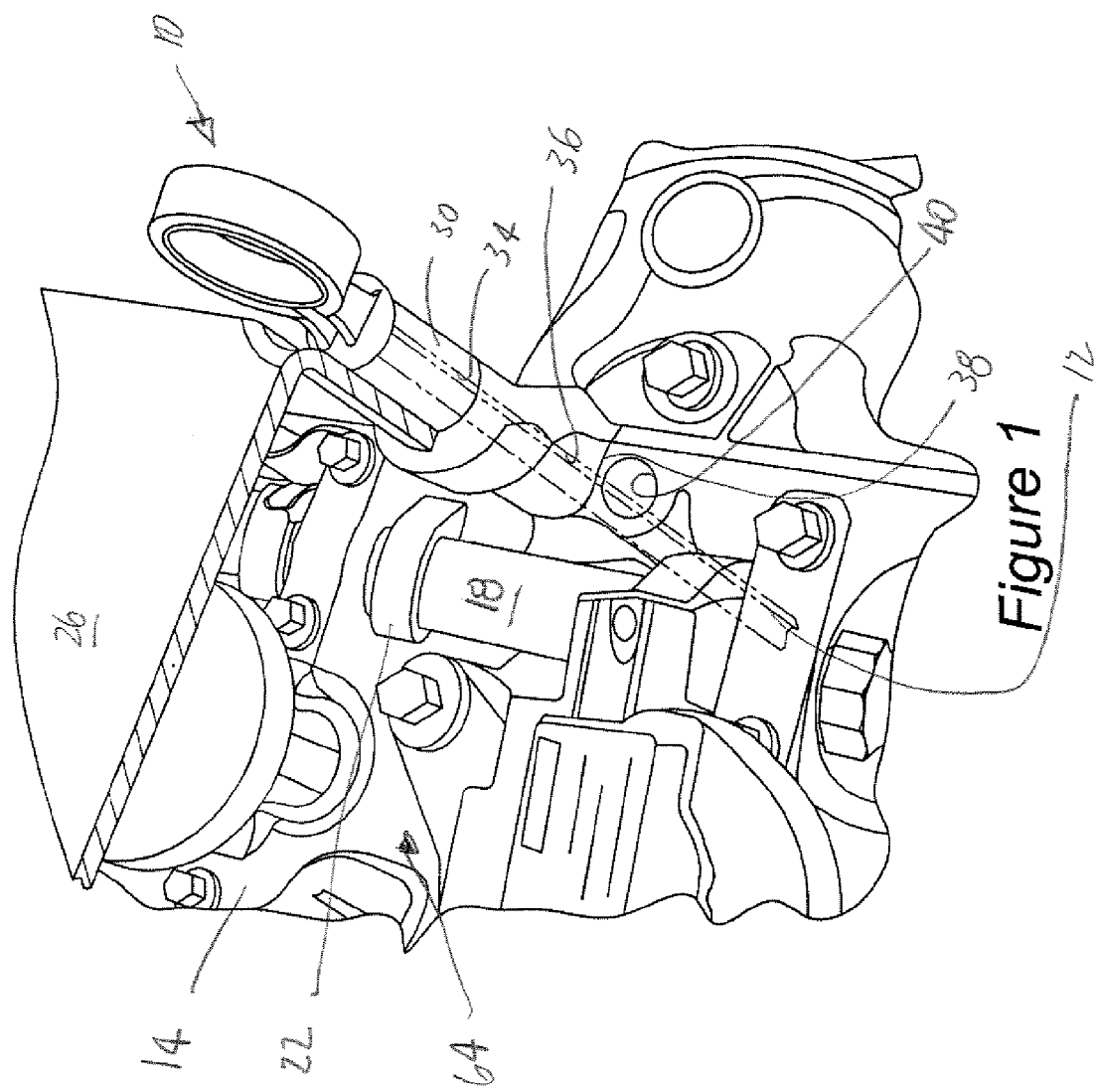
FIG. 1 is a perspective view of an upper portion of an engine having an oil level indicating system according to the present invention.
Figure 2:
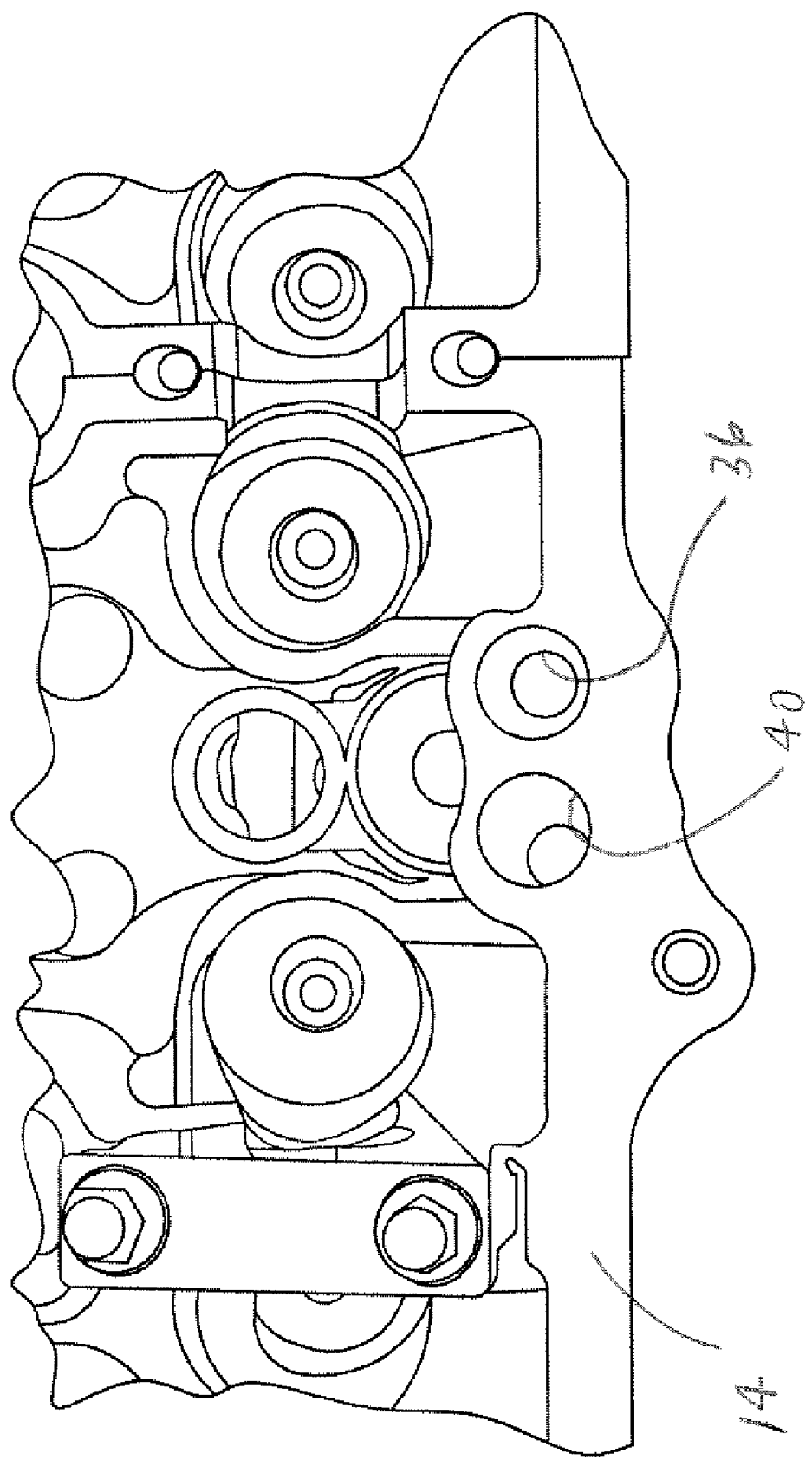
FIG. 2 is a portion of a cylinder head showing passages incorporated in the present oil level indicating system.
Figure 3:
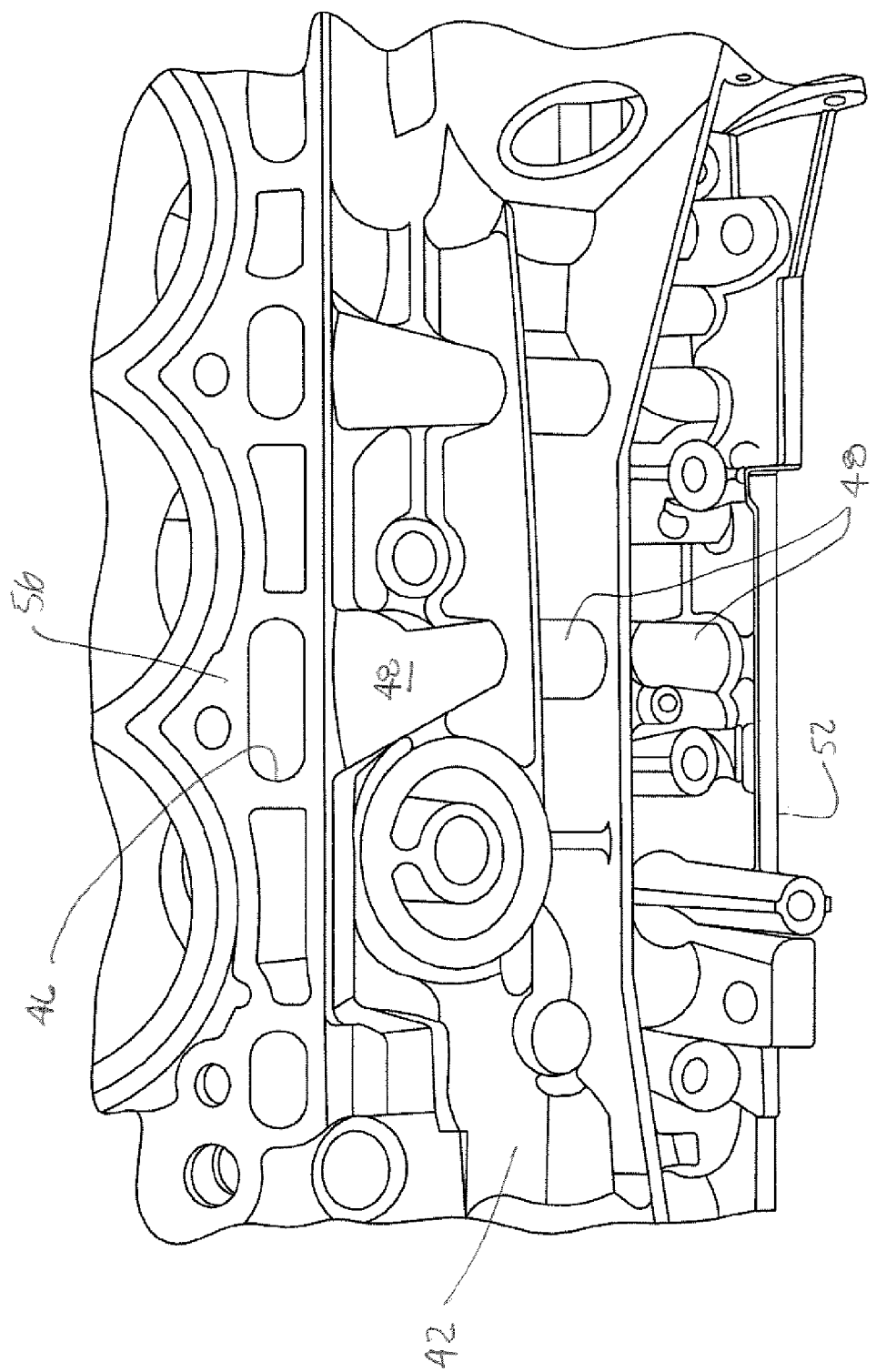
FIG. 3 is a perspective view of a cylinder block according to the present invention.
Figure 4:
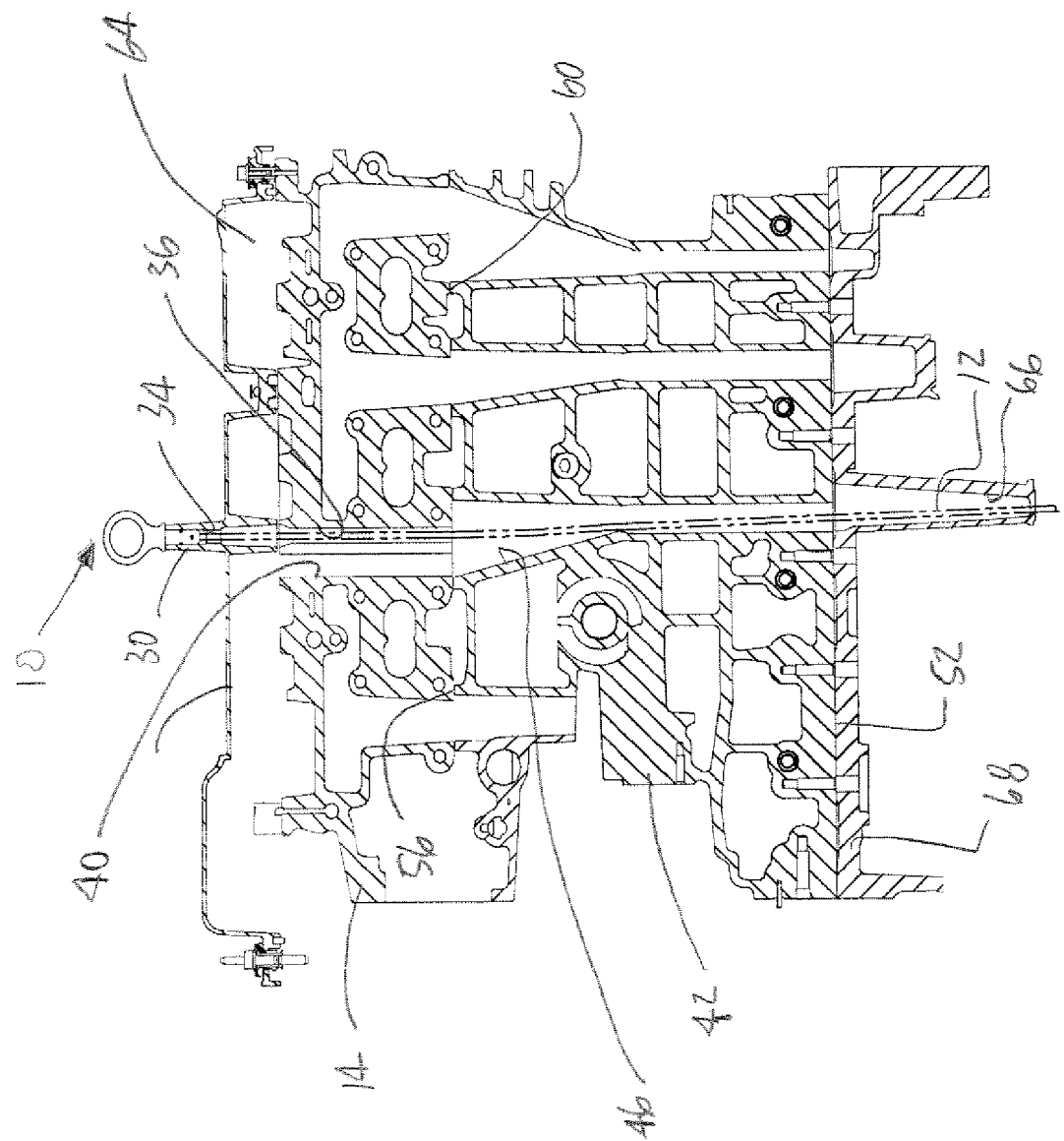
FIG. 4 is a sectional view of an engine having an oil level indicating system according to the present invention.
Figure 5:
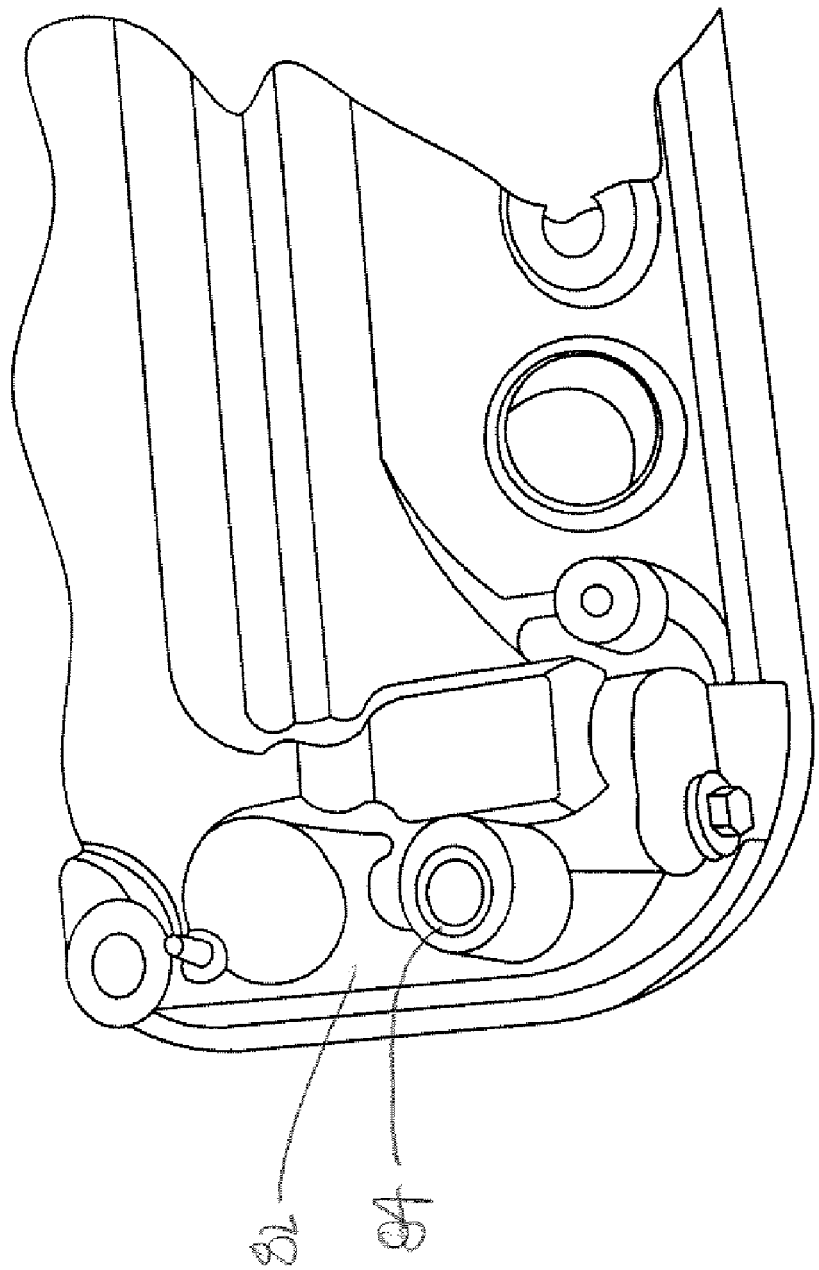

As shown in FIG. 1, oil level indicator 10 is mounted within boss 30 which is integral with camshaft cover 26. Boss 30 has a bore 34, through which indicator blade 12 extends. Boss 30 is sealingly engaged with cylinder head 14. This sealing engagement is with cylinder passage 36, through which blade 12 passes. Cover 26 encloses camshaft space 64. This is shown in FIGS. 1 and 4. Because camshaft 18, which has a number of cam lobes 22, rotates at half crankshaft speed, a great deal of oil is thrown about camshaft space 64. However, because camshaft cover boss 30 is sealed to cylinder head 14 about cylinder head passage 36, fugitive oil is prevented from entering indicator passageway from camshaft space 64. As shown in FIG. 4, the indicator passageway extends upwardly from oil pan rail 52 of cylinder block 42 to cylinder head mating surface 56. This portion of the indicator passageway is defined by an integral vent stack 48 (FIG. 3), which is cast onto an outside surface of cylinder block 42. As further shown in FIG. 4, cylinder block passage 46 extends generally vertically through cylinder block 42 and provides a passage for not only oil indicator blade 12, but also a crankcase vent passage, which is completed by passage 40 extending through cylinder head 14. It should be noted that crankcase vent passage 40 as completed by cylinder block passage 46, does not function as an oil drainback for camshaft space 64. For this reason, it is possible to get an accurate reading from indicator blade 12, because fugitive oil is prevented from entering an indicator passageway.

Returning now to cylinder head 14, as seen from FIG. 4 that cylinder head passage 36 extends generally through the cylinder head from lower portion of boss 30 to cylinder block mating surface 60. At the opposite end of indicating blade 12, a channel 66, is formed in oil pan 68 for the purpose of allowing clearance for indicating blade 12.

It is important to note that integral stack 48, which functions as a tube, is case in place with the bulk of cylinder block 42, and thereby obviates problems with prior art designs having externally mounted add-on tubes which were subject to leaks, dislodgement, and damage.

While particular embodiments of the invention have been shown and described, numerous variations and alternate embodiments will occur to those skilled in the art. Accordingly, it is intended that the invention be limited only in terms of the appended claims.

What is claimed is:

1. An oil level indicating system for an internal combustion engine, comprising:
   an indicator passageway comprising:
      a cylinder block passage extending generally vertically through a cylinder block from an oil pan rail to a cylinder head mating surface;
      a cylinder head passage extending generally vertically through a cylinder head from a cylinder block mating surface to a space enclosed by an upper cover, with said cylinder head passage being in registry with said cylinder block passage;
      a ported boss extending through an upper engine cover, with said ported boss having a lower end in registry with, and sealingly engaged with, an upper portion of said cylinder head passage; and
   an oil level indicator adapted to be extended through said indicator passageway from an upper portion of said ported boss to a location below said oil pan rail.

2. An oil level indicating system according to claim 1, wherein said ported boss extends through a camshaft cover mounted to said cylinder head.

3. An oil level indicating system according to claim 1, wherein at least a portion of said cylinder block passage is formed as an outer surface of said cylinder block.

4. An oil level indicating system according to claim 1, wherein said indicator passageway further comprises a channel formed in an oil pan attached to the oil pan rail of said cylinder block.

5. An oil level indicating system according to claim 1, wherein at least a portion of said cylinder block passage is formed as a tube comprising an outer surface of said cylinder block.

6. An oil level indicating system according to claim 1, wherein said cylinder block passage extends through an integral vent stack cast into an outside surface of the cylinder block.

7. An oil level indicating system for an internal combustion engine, comprising:
   an oil level indicator mount comprising a boss extending upwardly from a camshaft cover mounted to a cylinder head, with said boss being formed integrally with said cover, and with said boss having a port allowing passage of an indicator;
   an indicator passageway comprising:
      a cylinder block passage extending generally vertically through an integral cylinder block vent stack from an oil pan rail to a cylinder head mating surface;
      a cylinder head passage extending generally vertically through a cylinder head from a cylinder block mating surface to a space enclosed by said camshaft cover, with said cylinder head passage being in registry with said cylinder block passage and with said port formed in said boss; and
   an oil level indicator adapted to be extended through said indicator passageway from an upper portion of said boss to a location below said oil pan rail.

8. An oil level indicating system according to claim 7, further comprising a crankcase vent passage extending through said cylinder head adjacent said indicator passageway formed in said cylinder head.

9. An oil level indicating system according to claim 7, wherein said boss is sealed to said cylinder head so as to prevent fugitive oil from entering said indicator passageway from said space enclosed by said camshaft cover.

10. An oil level indicating system according to claim 7, wherein said cylinder block vent stack is cast in place upon an exterior surface of said cylinder block.

* * * * *